US008270634B2

(12) United States Patent
Harney et al.

(10) Patent No.: US 8,270,634 B2
(45) **Date of Patent: *Sep. 18, 2012**

(54) MULTIPLE MICROPHONE SYSTEM

(75) Inventors: Kieran P. Harney, Andover, MA (US); Jason Weigold, Somerville, MA (US); Gary Elko, Summit, NJ (US)

(73) Assignee: Analog Devices, Inc., Norwood, MA (US)

( * ) Notice: Subject to any disclaimer, the term of this patent is extended or adjusted under 35 U.S.C. 154(b) by 1419 days.

This patent is subject to a terminal disclaimer.

(21) Appl. No.: 11/828,049

(22) Filed: Jul. 25, 2007

(65) Prior Publication Data

US 2008/0049953 A1 Feb. 28, 2008

Related U.S. Application Data

(60) Provisional application No. 60/833,032, filed on Jul. 25, 2006.

(51) Int. Cl.
*H04B 15/00* (2006.01)

(52) U.S. Cl. ........ 381/94.5; 381/123; 381/92; 381/94.7; 381/113

(58) Field of Classification Search .............. 381/91–92, 381/111, 113, 94.1, 94.3, 122, 94.7, 94.5, 381/123
See application file for complete search history.

(56) References Cited

U.S. PATENT DOCUMENTS

| | | | | |
|---|---|---|---|---|
| 4,492,825 | A | 1/1985 | Brzezinski et al. | 179/111 |
| 4,524,247 | A | 6/1985 | Lindenberger et al. | 179/111 |
| 4,533,795 | A | 8/1985 | Baumhauer, Jr. et al. | 179/111 |
| 4,558,184 | A | 12/1985 | Busch-Vishniac et al. | 179/111 |
| 4,744,863 | A | 5/1988 | Guckel et al. | 156/653 |
| 4,776,019 | A | 10/1988 | Miyatake | 381/174 |
| 4,825,335 | A | 4/1989 | Wilner | 361/283 |
| 4,853,669 | A | 8/1989 | Guckel et al. | 338/4 |
| 4,996,082 | A | 2/1991 | Guckel et al. | 427/99 |
| 5,090,254 | A | 2/1992 | Guckel et al. | 73/862.59 |
| 5,113,466 | A | 5/1992 | Acarlar et al. | 385/88 |
| 5,146,435 | A | 9/1992 | Bernstein | 367/181 |

(Continued)

FOREIGN PATENT DOCUMENTS

DE 196 48 424 6/1998

(Continued)

OTHER PUBLICATIONS

International Searching Authority, International Search Report—International Application No. PCT/US2007/074328, dated Mar. 27, 2008, together with Written Opinion of the International Searching Authority, 10 pages.

(Continued)

*Primary Examiner* — Goins Davetta
*Assistant Examiner* — Disler Paul
(74) *Attorney, Agent, or Firm* — Sunstein Kann Murphy & Timbers LLP

(57) ABSTRACT

A microphone system has a primary microphone for producing a primary signal, a secondary microphone for producing a secondary signal, and a selector operatively coupled with both the primary microphone and the secondary microphone. The system also has an output for delivering an output audible signal principally produced by one of the to microphones. The selector selectively permits either 1) at least a portion of the primary signal and/or 2) at least a portion of the secondary signal to be forwarded to the output as a function of the noise in the primary signal.

16 Claims, 6 Drawing Sheets

U.S. PATENT DOCUMENTS

| | | | | |
|---|---|---|---|---|
| 5,178,015 | A | 1/1993 | Loeppert et al. | 73/718 |
| 5,188,983 | A | 2/1993 | Guckel et al. | 437/209 |
| 5,226,087 | A * | 7/1993 | Ono et al. | 381/92 |
| 5,258,097 | A | 11/1993 | Mastrangelo | 156/644 |
| 5,303,210 | A | 4/1994 | Bernstein | 367/181 |
| 5,314,572 | A | 5/1994 | Core et al. | 156/643 |
| 5,317,107 | A | 5/1994 | Osorio | 174/52.4 |
| 5,363,452 | A | 11/1994 | Anderson | 381/168 |
| 5,452,268 | A | 9/1995 | Bernstein | 367/181 |
| 5,490,220 | A | 2/1996 | Loeppert | 381/168 |
| 5,593,926 | A | 1/1997 | Fujihira | 437/209 |
| 5,596,222 | A | 1/1997 | Bernstein | 257/620 |
| 5,632,854 | A | 5/1997 | Mirza et al. | 438/53 |
| 5,633,552 | A | 5/1997 | Lee et al. | 310/311 |
| 5,658,710 | A | 8/1997 | Neukermans | 430/320 |
| 5,684,324 | A | 11/1997 | Bernstein | 257/415 |
| 5,692,060 | A | 11/1997 | Wickstrom | 381/169 |
| 5,740,261 | A | 4/1998 | Loeppert et al. | 381/168 |
| 5,870,482 | A | 2/1999 | Loeppert et al. | 381/174 |
| 5,923,995 | A | 7/1999 | Kao et al. | 438/460 |
| 5,939,633 | A | 8/1999 | Judy | 73/514.32 |
| 5,956,292 | A | 9/1999 | Bernstein | 367/140 |
| 5,960,093 | A | 9/1999 | Miller | 381/324 |
| 6,128,961 | A | 10/2000 | Haronian | 73/774 |
| 6,140,689 | A | 10/2000 | Scheiter et al. | 257/414 |
| 6,226,386 | B1 | 5/2001 | Akino | 381/173 |
| 6,243,474 | B1 | 6/2001 | Tai et al. | 381/174 |
| 6,249,075 | B1 | 6/2001 | Bishop et al. | 310/338 |
| 6,324,907 | B1 | 12/2001 | Halteren et al. | 73/431 |
| 6,426,239 | B1 | 7/2002 | Gogoi et al. | 438/53 |
| 6,505,511 | B1 | 1/2003 | Geen et al. | 73/504.12 |
| 6,522,762 | B1 | 2/2003 | Mullenborn et al. | 381/174 |
| 6,535,460 | B2 | 3/2003 | Loeppert et al. | 367/181 |
| 6,535,663 | B1 | 3/2003 | Chertkow | 385/18 |
| 6,552,469 | B1 | 4/2003 | Pederson et al. | 310/309 |
| 6,667,189 | B1 | 12/2003 | Wang et al. | 438/53 |
| 6,677,176 | B2 | 1/2004 | Wong et al. | 438/50 |
| 6,704,427 | B2 | 3/2004 | Kearey | 381/355 |
| 6,732,588 | B1 | 5/2004 | Mullenborn et al. | 73/715 |
| 6,741,709 | B2 | 5/2004 | Kay et al. | 381/175 |
| 6,753,583 | B2 | 6/2004 | Stoffel et al. | 257/416 |
| 6,781,231 | B2 | 8/2004 | Minervini | 257/704 |
| 6,812,620 | B2 | 11/2004 | Scheeper et al. | 310/324 |
| 6,816,301 | B1 | 11/2004 | Schiller | 359/290 |
| 6,829,131 | B1 | 12/2004 | Loeb et al. | 361/234 |
| 6,847,090 | B2 | 1/2005 | Loeppert | 257/418 |
| 6,857,312 | B2 | 2/2005 | Choe et al. | 73/170.13 |
| 6,859,542 | B2 | 2/2005 | Johannsen et al. | 381/174 |
| 6,883,903 | B2 | 4/2005 | Truninger et al. | 347/71 |
| 6,912,759 | B2 | 7/2005 | Izandnegahdar et al. | 29/25.35 |
| 6,914,992 | B1 | 7/2005 | van Halteren et al. | 381/113 |
| 7,142,682 | B2 | 11/2006 | Müllenborn et al. | 381/322 |
| 7,148,077 | B2 | 12/2006 | Fuertsch et al. | 438/53 |
| 7,166,910 | B2 | 1/2007 | Minervini | 257/704 |
| 2002/0009203 | A1 * | 1/2002 | Erten | 381/92 |
| 2002/0057815 | A1 * | 5/2002 | Killion | 381/313 |
| 2002/0079550 | A1 | 6/2002 | Daneman et al. | 257/459 |
| 2002/0102004 | A1 | 8/2002 | Minervini | 381/175 |
| 2003/0016839 | A1 | 1/2003 | Loeppert et al. | 381/174 |
| 2003/0133588 | A1 | 7/2003 | Pedersen | 381/423 |
| 2004/0179705 | A1 | 9/2004 | Wang et al. | 381/175 |
| 2004/0184632 | A1 | 9/2004 | Minervini | 381/355 |
| 2004/0184633 | A1 | 9/2004 | Kay et al. | 381/355 |
| 2005/0005421 | A1 | 1/2005 | Wang et al. | 29/594 |
| 2005/0018864 | A1 | 1/2005 | Minervini | 381/175 |
| 2005/0041825 | A1 * | 2/2005 | Rasmussen et al. | 381/317 |
| 2005/0063553 | A1 | 3/2005 | Ozawa | 381/92 |
| 2005/0089188 | A1 | 4/2005 | Feng | 381/396 |
| 2005/0102721 | A1 | 5/2005 | Barth | 977/DIG. 1 |
| 2005/0185812 | A1 | 8/2005 | Minervini | 381/355 |
| 2006/0093170 | A1 | 5/2006 | Zhe et al. | 381/191 |
| 2006/0093171 | A1 | 5/2006 | Zhe et al. | 381/191 |
| 2006/0116180 | A1 | 6/2006 | Minervini | 455/575.1 |
| 2006/0157841 | A1 | 7/2006 | Minervini | 257/680 |
| 2006/0280319 | A1 | 12/2006 | Wang et al. | 381/172 |
| 2007/0047744 | A1 | 3/2007 | Harney et al. | 381/113 |
| 2007/0057602 | A1 | 3/2007 | Song | 310/328 |
| 2007/0058826 | A1 | 3/2007 | Sawamoto et al. | 381/174 |

FOREIGN PATENT DOCUMENTS

| | | | |
|---|---|---|---|
| EP | 0545731 | | 9/1993 |
| EP | 0596456 | A1 | 5/1994 |
| EP | 0 783 107 | | 7/1997 |
| JP | 59-40798 | | 6/1984 |
| JP | 64-039194 | | 2/1989 |
| JP | 03-139097 | | 6/1991 |
| JP | 03139097 | | 6/1991 |
| JP | 08240609 | | 9/1996 |
| JP | 10-327494 | | 12/1998 |
| WO | WO 83/01362 | | 4/1983 |
| WO | WO 01/20948 | | 3/2001 |
| WO | WO 01/41497 | | 6/2001 |
| WO | WO 02/15636 | A2 | 2/2002 |
| WO | WO 02/45463 | | 6/2002 |
| WO | WO 02/052893 | A | 7/2002 |
| WO | WO 2005/036698 | | 4/2005 |
| WO | WO 2005/111555 | A1 | 11/2005 |
| WO | WO 2006/116017 | | 11/2006 |
| WO | WO 2007/029878 | A1 | 3/2007 |

OTHER PUBLICATIONS

Neumann, Jr. et al., *A Fully-Integrated CMOS-MEMS Audio Microphone*, The 12$^{th}$ International Conference on Solid State Sensors, Actuators and Microsystems Jun. 8-12, 2003, 4 pages.

Fan et al., *Development of Artificial Lateral-Line Flow Sensors*, Solid-State Sensor, Actuator and Microsystems Workshop, Jun. 2-6, 2002, 4 pages.

Hsieh et al., *A Micromachined Thin-film Teflon Electret Microphone*, Department of Electrical Engineering California Institute of Technology, 1997, 4 pages.

Bajdechi et al., *Single-Chip Low-Voltage Analog-to-Digital Interface for Encapsulation with Electret Microphone*, The 11$^{th}$ International Conference on Solid-State Sensors and Actuators, Jun. 10-14, 2001, 4 pages.

Schafer et al., *Micromachined Condenser Microphone for Hearing Aid Use*, Solid-State Sensor and Actuator Workshop, Jun. 8-11, 1998, 4 pages.

*Microphone industry to expand MEMS-based offerings*, The Information Network, online <www.theinformationnet.com>, printed Feb. 1, 2005, Nov. 14, 2003, 2 pages.

Kabir et al., *High Sensitivity Acoustic Transducers with Thin P+ Membranes and Gold Back-Plate*, Sensors and Actuators, vol. 78, Issue 2-3, Dec. 17, 1999, 17 pages.

Zou et al., *A Novel Integrated Silicon Capacitive Microphone—Floating Electrode "Electret" Microphone (FEEM)*, Journal of Microelectromechanical Systems, vol. 7, No. 2, Jun. 1998, 11 pages.

Ko et al., *Piezoelectric Membrane Acoustic Devices*, IEEE, 2002, 4 pages.

Chen et al., *Single-Chip Condenser Miniature Microphone with a High Sensitive Circular Corrugated Diaphragm*, IEEE, 2002, 4 pages.

Ma et al., *Design and Fabrication of an Integrated Programmable Floating-Gate Microphone*, IEEE, 2002, 4 pages.

Maxim Integrated Products *Electret Condenser Microphone Cartridge Preamplifier*, Maxim Integrated Products, Jul. 2002, 9 pages.

Ono et al., *Design and Experiments of Bio-mimicry Sound Source Localization Sensor with Gimbal-Supported Circular Diaphragm*, The 12$^{th}$ International Conference on Solid State Sensors, Actuators and Microsystems, Jun. 8-12, 2003, 4 pages.

Pedersen et al., *A Polymer Condenser Microphone on Silicon with On-Chip CMOS Amplifier*, Solid State Sensors and Actuators, 1997, 3 pages.

Yovcheva et al., *Investigation on Surface Potential Decay in PP Corona Electrets*, BPU-5: Fifth General Conference of the Balkan Physical Union, Aug. 25-29, 2003, 4 pages.

Fuldner et al., *Silicon Microphones with Low Stress Membranes*, The 11$^{th}$ International Conference on Solid-State Sensors and Actuators, Jun. 10-14, 2001, 4 pages.

Bernstein et al., *High Sensitivity MEMS Ultrasound Arrays by Lateral Ferroelectric Polarization*, Solid-State Sensor and Actuator Workshop, Jun. 4-8, 2000, 4 pages.

Sheplak et al., *A Wafer-Bonded, Silicon-Nitride Membrane Microphone with Dielectrically-Isolated, Single-Crystal Silicon Piezoresistors*, Solid-State Sensor and Actuator Workshop, Jun. 8-11, 1998, 4 pages.
Cunningham et al., *Wide bandwidth silicon nitride membrane microphones*, SPIE vol. 3223, Sep. 1997, 9 pages.
*Phone-Or/Technology*, online <file://C:\Documents%20and%20Settings\bmansfield\Local%20 Settings\Temporary%20-Internet%20Files\OLKE\Phone-or%20% . . . >, printed Feb. 1, 2005, 2 pages.
Mason, Jack, *Companies Compete to Be Heard on the Increasingly Noisy MEMS Phone Market*, Small Times: News about MEMS, Nanotechnology and Microsystems, Jul. 18, 2003, 4 pages.
Hall et al., *Self-Calibrating Micromachined Microphones with Integrated Optical Displacement Detection*, The 11th International Conference on Solid State Sensors and Actuators, Jun. 10-14, 2001, 4 pages.
Prismark Partners LLC, *The Prismark Wireless Technology Report*, Prismark Partners LLC, Mar. 2005, 27 pages.
Stahl, et al., *Thin Film Encapsulation of Acceleration Sensors Using Polysilicon Sacrificial Layer, Transducers '03, The 12$^{th}$* International Conference on Solid State Sensors, Actuators and Microsystems, Jun. 8-12, 2003, 4 pages.
Bernstein, *MEMS Air Acoustics Research The Charles Stark Draper Laboratory*, PowerPoint Presentation, Aug. 1999, 8 pages.
Weigold et al., *A MEMS Condenser Microphone for Consumer Applications*, Analog Devices, Inc. and Pixtronix, Inc., Jan. 2006, 3 pages.
Gale et al., *MEMS Packaging*, University of Utah, Microsystems Principles, PowerPoint Presentation, Oct. 11, 2001, 8 pages.
*Liquid Crystal Polymer (LCP) Air Cavity Packages*, Quantum Leap Packaging, Inc., Brochure, 2004, 2 pages.
Rugg et al., *Thermal Package Enhancement Improves Hard Disk Drive Data Transfer Performance*, 6 pages.
Kopola et al., *MEMS Sensor Packaging Using LTCC Substrate Technology*, VTT Electronics, Proceedings of SPIE vol. 4592, 2001, pp. 148-158.
Harper (Editor-in-Chief), *Electronic Packaging and Interconnection Handbook*, Third Edition, McGraw-Hill, Chapter 7, Section 7.2.3.1, 2000, 5 pages.
Scheeper et al., *A review of silicon microphones*, Sensors and Actuators A, ol . a44, No. 1, Jul. 1994, pp. 1-11.
M. Brauer et al. Increasing the Performance of Silicon Microphones by the Benefit of a Complete System Simulation, IEEE, pp. 528-531, 2004.
M. Brauer et al., *Silicon Microphone Based on Surface and Bulk Micromachining*, Journal of Micromechanics and Microengineering, 11 (2001), pp. 319-322.
S. Bouwstra et al., *Silicon Microphones—A Danish Perspective*, Journal of Micromechanics and Microengineering, 8 (1998) pp. 64-68.
Lemkin, M., et al., *A 3-Axis Force Balanced Accelerometer Using a Single Proof-Mass*, Transducers 97, IEEE, Jun. 16-19, 1997.
Japanese Patent Office, Japanese Official Action—Patent Application No. 2009-521983, dated Oct. 31, 2011 (2 pages).
Japanese Patent Office, *English Translation* of Japanese Official Action—Patent Application No. 2009-521983, dated Oct. 31, 2011 (4 pages).

* cited by examiner

MULTIPLE MICROPHONE SYSTEM

PRIORITY

This patent application claims priority from provisional U.S. patent application No. 60/833,032, filed Jul. 25, 2006, entitled, "MULTIPLE MICROPHONE SYSTEM," naming Kieran Harney, Jason Weigold, and Gary Elko as inventors, the disclosure of which is incorporated herein, in its entirety, by reference.

RELATED APPLICATIONS

This patent application is related to U.S. patent application Ser. No. 11/492,314, filed Jul. 25, 2006, entitled, "NOISE MITIGATING MICROPHONE SYSTEM AND METHOD," naming Kieran Harney, Jason Weigold, and Gary Elko as inventors, the disclosure of which is incorporated herein, in its entirety, by reference.

FIELD OF THE INVENTION

The invention generally relates to microphones and, more particularly, the invention relates to improving the performance of microphone systems.

BACKGROUND OF THE INVENTION

Condenser microphones typically have a diaphragm that forms a capacitor with an underlying backplate. Receipt of an audible signal causes the diaphragm to vibrate to form a variable capacitance signal representing the audible signal. It is this variable capacitance signal that can be amplified, recorded, or otherwise transmitted to another electronic device.

Background noise often can degrade or otherwise swamp the input audible signal intended to be processed.

SUMMARY OF THE INVENTION

In accordance with one embodiment of the invention, a microphone system has a primary microphone for producing a primary signal, a secondary microphone for producing a secondary signal, and a selector operatively coupled with both the primary microphone and the secondary microphone. The system also has an output for delivering an output audible signal principally produced by one of the two microphones. The selector selectively permits 1) at least a portion of the primary signal and/or 2) at least a portion of the secondary signal to be forwarded to the output as a function of the noise in the primary signal.

It should be noted that respective portions of the primary signal or secondary signal may be processed prior to being forwarded to the output.

Moreover, the primary microphone may have a primary low frequency cut-off, while the secondary microphone may have a secondary low frequency cut-off that is greater than the primary low frequency cut-off. To that end, among other ways, the primary microphone may have a primary diaphragm and a primary circumferential gap defined at least in part by the primary diaphragm. In a similar manner, the secondary microphone may have a secondary diaphragm and a secondary circumferential gap defined at least in part by the secondary diaphragm. To provide the above noted low frequency cut-off relationship, the secondary circumferential gap may be greater than the primary circumferential gap.

In illustrative embodiments, the selector forwards at least a portion of the primary signal to the output if the noise is below about a predefined amount. In a corresponding manner, the selector may forward at least a portion of the secondary signal to the output if the noise is greater than about the predefined amount.

The portion of the primary signal illustratively is not forwarded to the output when the portion of the secondary signal is forwarded to the output. In like manner, the portion of the secondary signal illustratively is not forwarded to the output when the portion of the primary signal is forwarded to the output. Moreover, the selector may have a detector that detects saturation of the primary microphone.

In accordance with another embodiment of the invention, a microphone system has a primary microphone for producing a primary signal, a secondary microphone with a high pass filter for producing a secondary signal, and a base mechanically coupling the two microphones. The system also has a base mechanically coupling the primary and secondary microphones, a selector operatively coupled with the primary microphone and the secondary microphone, and an output. The selector, which has a detector for detecting low frequency noise, permits at least a portion of the primary signal to be forwarded to the output if the detector detects no low frequency noise. In a corresponding manner, the selector permits at least a portion of the secondary signal to be forwarded to the output if the detector detects low frequency noise.

Among other implementations, the primary and secondary microphones may be MEMS devices. In addition, among other things, the base may include a two way communication device (e.g., a mobile or cordless telephone).

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

In illustrative embodiments, a microphone system selects between the output of a primary and a secondary microphone based upon the noise level in the output of the primary microphone. More specifically, the secondary microphone is configured to not detect certain types of noise (e.g., low frequency noise, such as wind noise in a cellular telephone). As a result, its signal may not detect as wide a range of frequencies as those detected by the primary microphone.

In other words, the primary microphone may be more sensitive than the secondary microphone. As a result, the primary microphone may detect noise that is not detectable, or only partially detectable, by the secondary microphone. Accordingly, if the noise detected by the primary microphone exceeds some prespecified threshold, the microphone system delivers the output of the secondary microphone to its output. Although the output of the secondary microphone may not have as wide a frequency range, in many instances it still is anticipated to be more discernable than a signal from a primary microphone having significant noise. Details of illustrative embodiments are discussed below.

Figure 1:
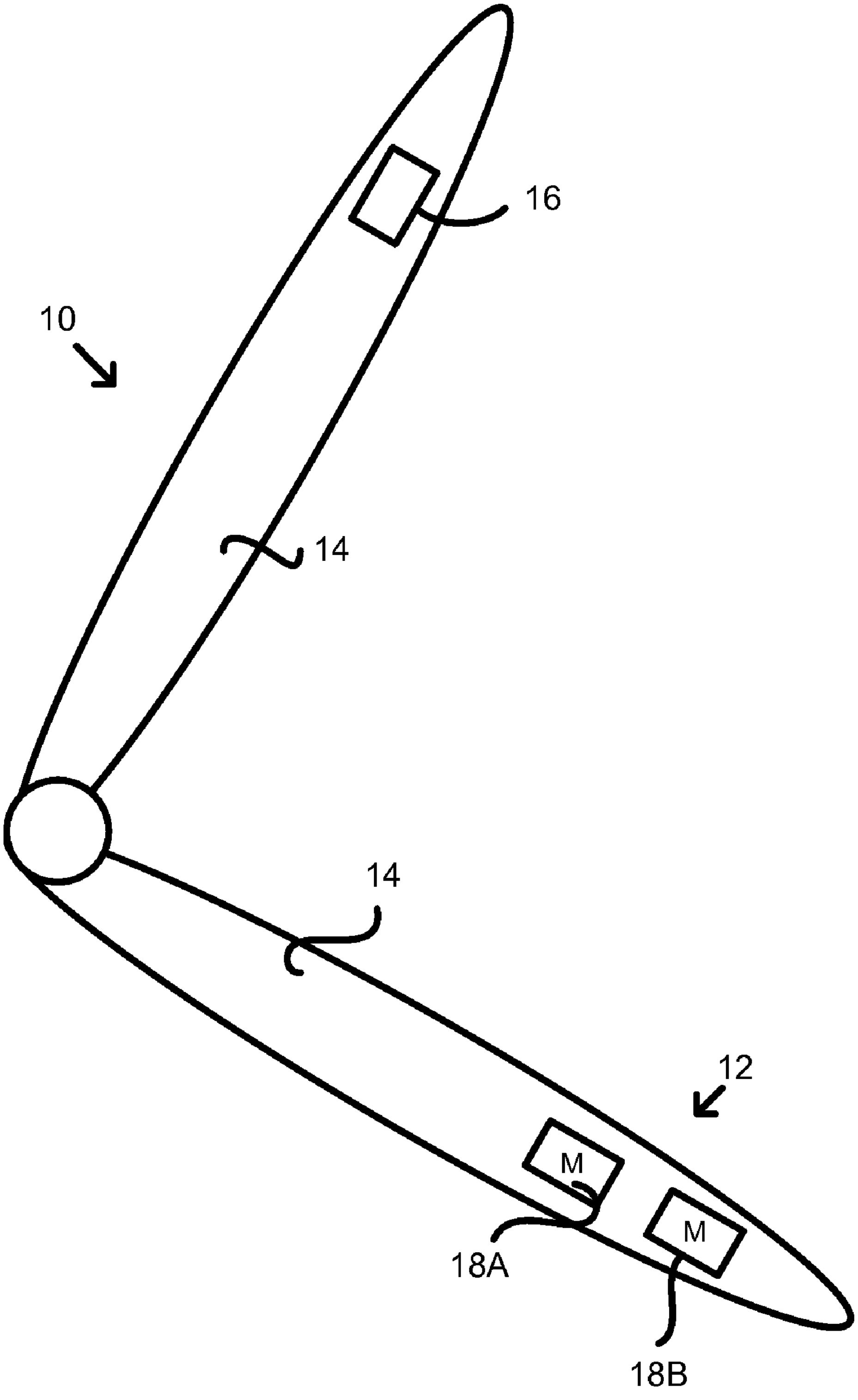
FIG. 1 schematically shows a base having a microphone system configured in accordance with illustrative embodiments of the invention.

FIG. 1 schematically shows a mobile telephone acting as a base 10 for supporting a microphone system 12 configured in accordance with illustrative embodiments of the invention. To that end, the mobile telephone (also identified by reference number 10) has a plastic body 14 containing the microphone system 12 for producing an output audio signal, an earpiece 16, and various other components, such as a keypad, transponder logic and other logic elements (not shown). As discussed in greater detail below, the microphone system 12 has a primary microphone 18A and a secondary microphone 18B that are both fixedly secured in very close proximity to each other, and fixedly secured to the telephone body 14. More generally, both microphones 18A and 18B illustratively are mechanically coupled to each other (e.g., via the base 10 or a direct connection) to ensure that they receive substantially the same mechanical signals. For example, if the telephone 10 is dropped to the ground, both microphones 18A and 18B should receive substantially identical mechanical/inertial signals representing the movement and subsequent shock(s) (e.g., if the telephone 10 bounces several times after striking the ground) of the telephone 10.

In alternative embodiments, the microphone system 12 is not fixedly secured to the telephone body 14—it may be movably secured to the telephone body 14. Since they are mechanically coupled, both microphones 18A and 18B nevertheless still should receive substantially the same mechanical signals as discussed above. For example, the two microphones 18A and 18B may be formed on a single die that is movably connected to the telephone body 14. Alternatively, the microphones 18A and 18B may be formed by separate dies packaged together or separately.

The base 10 may be any structure that can be adapted to use a microphone. Those skilled in the art thus should understand that other structures may be used as a base 10, and that the mobile telephone 10 is discussed for illustrative purposes only. For example, among other things, the base 10 may be a movable or relatively small device, such as the dashboard of an automobile, a computer monitor, a video recorder, a camcorder, or a tape recorder. The base 10 also may be a surface, such as the substrate of a single chip or die, or the die attach pad of a package. Conversely, the base 10 also may be a large or relatively unmovable structure, such as a building (e.g., next to the doorbell of a house).

Figure 2:
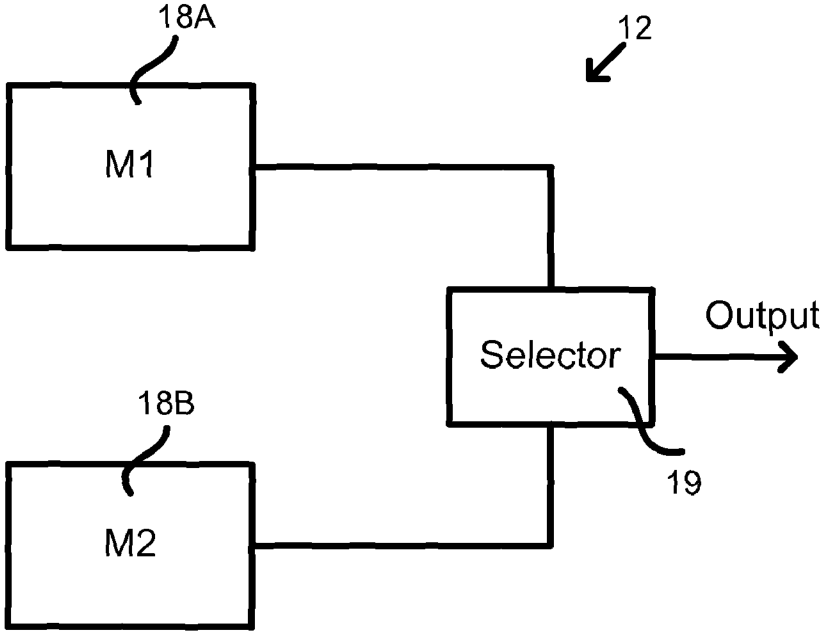
FIG. 2 schematically shows a microphone system configured in accordance with illustrative embodiments of the invention.

FIG. 2 schematically shows additional details of the illustrative microphone system 12 shown in FIG. 1. More specifically, the system 12 has a primary microphone 18A and a (less sensitive) secondary microphone 18B coupled with a selector 19 that selects between the outputs of both microphones. As discussed above, the selector 19 of illustrative embodiments forwards no more than (at least a portion of) one of the signals to its output depending upon the noise in the signal produced by the primary microphone 18A. It should be noted that either signal may be processed before or after reaching the selector 19. For example, the signal may be amplified, further filtered, etc. . . . before or after reaching the selector 19.

Figure 3A:
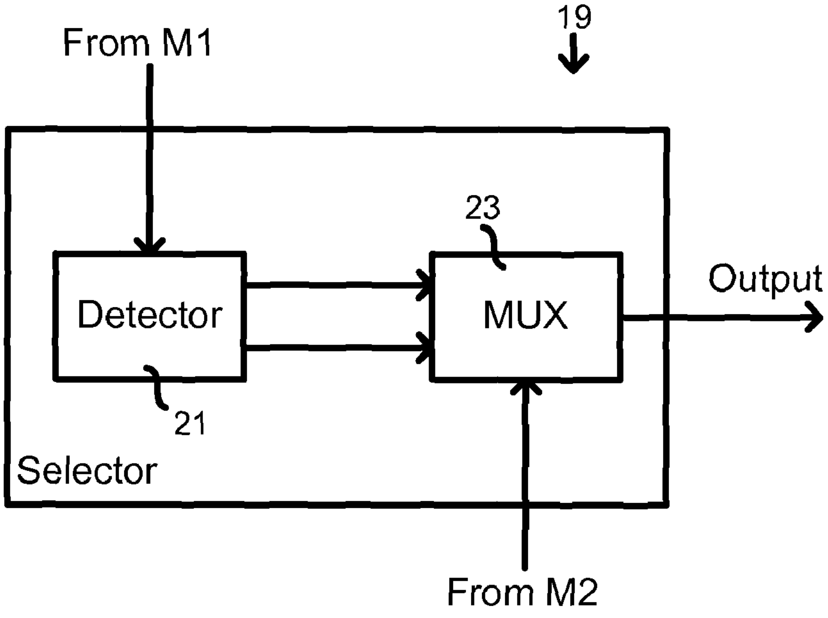
FIG. 3A schematically shows a first embodiment of a selector used in the microphone system of FIG. 2.

FIG. 3A schematically shows additional details of one embodiment of a selector 19 shown in FIG. 2. Specifically, the selector 19 has a detector 21 for detecting certain types of noise in the signal from the primary microphone 18A. For example, the noise may be low-frequency noise that is not detectable or partially detectable by the less sensitive secondary microphone 18B. To that end, those skilled in the art could design hardware or software for detecting some noise condition, such as overload or clipping of a circuit.

The selector 19 also may have some multiplexing apparatus (i.e., a multiplexer 23) that forwards one of the two noted microphone signals to its output. To that end, the microphone may have a select input for receiving a select signal from a detector 21. If the select signal is a first value (e.g., logical "1"), the multiplexer 23 will forward the output signal of the primary microphone 18A. To the contrary, if the selector 19 is a second value (e.g., logical "0"), then the multiplexer 23 will forward the output of the secondary microphone 18B.

Of course, it should be noted that discussion of the specific means for performing the selection is illustrative and not intended to limit various embodiments. Those skilled in the art should understand that other implementations may be used.

Figure 3B:
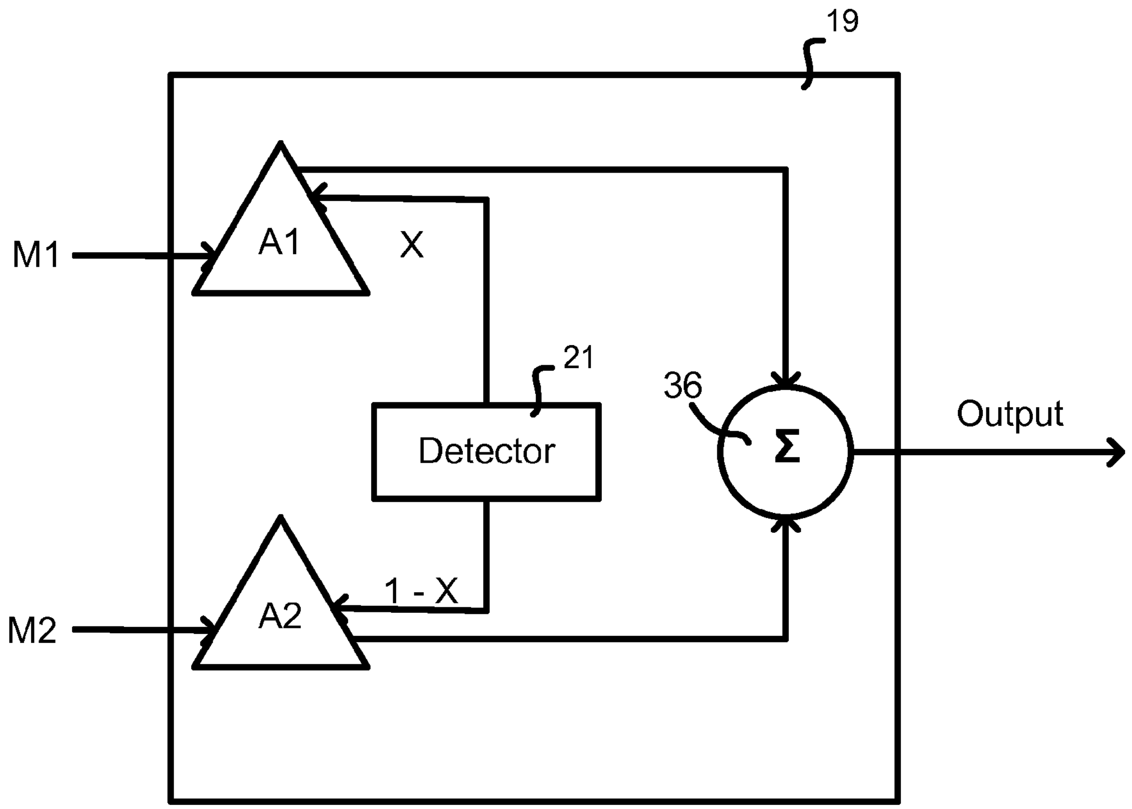
FIG. 3B schematically shows a second embodiment of a selector used in the microphone system of FIG. 2.

FIG. 3B thus schematically shows another embodiment of the selector 19, which uses a "soft switch" concept. Specifically, the selector 19 in this embodiment switches more gradually between microphones 18A and 18B as a function of noise detected in the signal from the primary microphone 18A. In other words, rather than just forwarding to the output at least a portion of the signal from one microphone 18A or 18B (i.e., in a manner similar to the embodiment shown in FIG. 3A), this embodiment may forward portions of the signals of both microphones to the output (as a function of noise). To those ends, the selector 19 has an input for receiving the output signals from the microphones 18A and 18B, and first and second amplifiers A1 and A2 that each respectively receive one of the microphone signals.

The detector 21 forwards, as a function of the noise levels of the output signal of the primary microphone 18A, a first amplification value X to the first amplifier A1, and a second amplification value 1-X to the second amplifier A2. These amplification values determine the relative compositions of the signals of the two amplifiers A1 and A2 within the final selector signal. A summing module 36 thus sums the outputs of these two amplifiers A1 and A2 to produce the final output signal of the selector 19.

For example, if there the output of the primary microphone 18A has no noise, the detector 21 may set the value "X" to "1." As a result the signal from the primary microphone 18A is fully passed to the summing module 36, while no portion of the signal of the secondary microphone 18B is passed. When the noise is at some intermediate level, however, portions of both signals from the two microphones 18A and 18B may form the final selector output signal. In other words, in this case, the selector output signal is a combination of the signals from both microphones 18A and 18B. Of course, when it detects a significant enough noise level in the primary microphone output signal, the detector 21 may set the value "X" to "0," which causes no part of the primary microphone signal to reach the output. Instead, in that case, the output signal of the secondary microphone 18B forms the final output signal of the selector 19.

The detector 21 may determine an appropriate value for "X" by any number of means. For example, the detector 21 generate the value "X" by using a look-up table in internal memory, or an internal circuit that generates the value on the fly.

Figure 4:
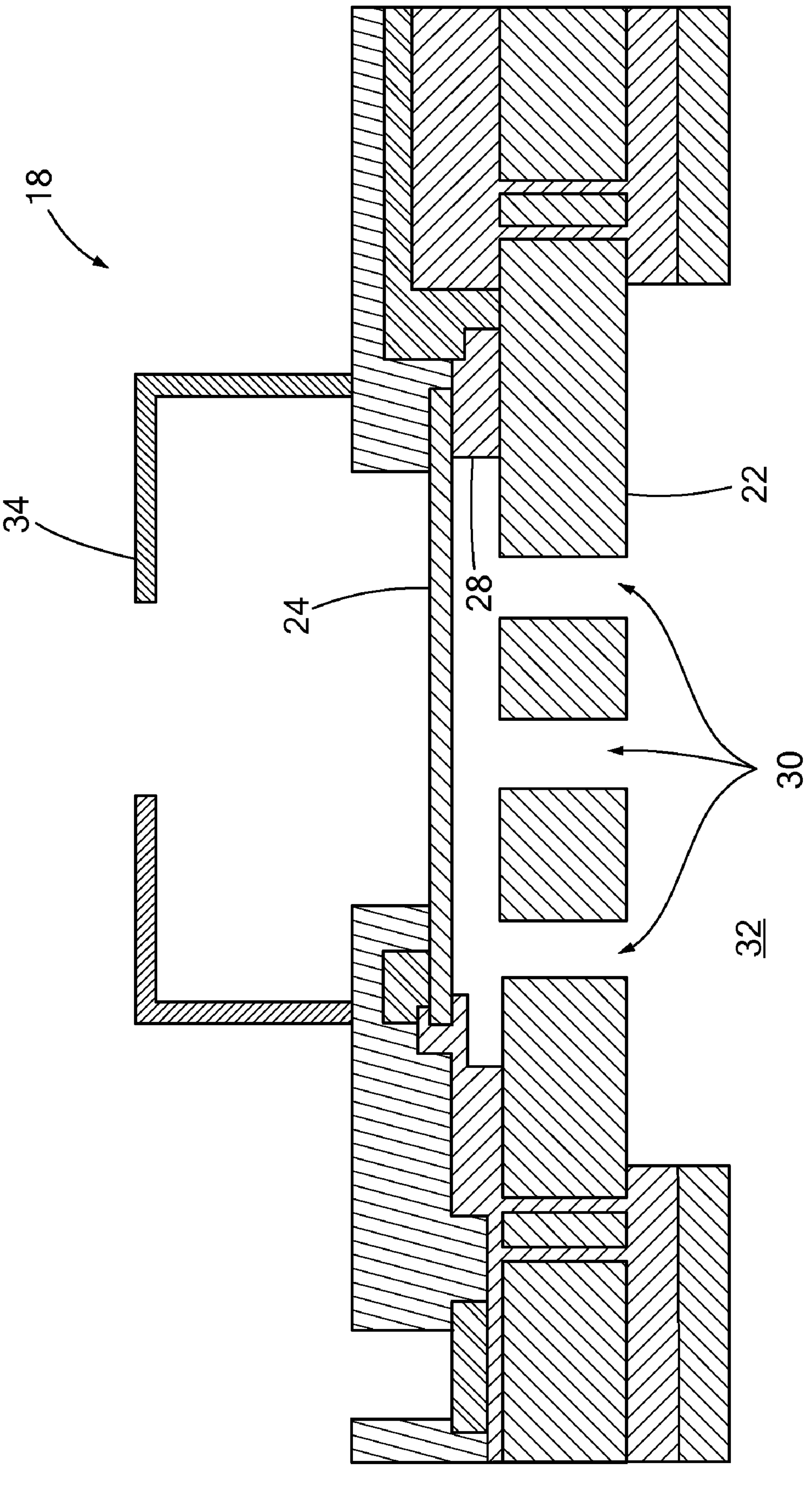
FIG. 4 schematically shows a cross-sectional view of a MEMS microphone that may be used with illustrative embodiments of the invention.

Various embodiments may use any conventional microphone in the art that can be adapted for the discussed purposes. FIG. 4 schematically shows a cross-sectional view of a MEMS microphone (identified by reference number 18) generally representing the structure of one embodiment of the primary and secondary microphones 18A and 18B. Among other things, the microphone 18 includes a static backplate 22 that supports and forms a capacitor with a flexible diaphragm 24. In illustrative embodiments, the backplate 22 is formed from single crystal silicon, while the diaphragm 24 is formed from deposited polysilicon. A plurality of springs 26 (not shown well in FIG. 4, but more explicitly shown in FIGS. 5A and 5B) movably connect the diaphragm 24 to the backplate 22 by means of various other layers, such as an oxide layer 28. To facilitate operation, the backplate 22 has a plurality of throughholes 30 that lead to a back-side cavity 32. Depending on the embodiment and its function, the microphone 18 may have a cap 34 to protect it from environmental contaminants.

Audio signals cause the diaphragm 24 to vibrate, thus producing a changing capacitance. On-chip or off-chip circuitry (not shown) converts this changing capacitance into electrical signals that can be further processed. It should be noted that discussion of the microphone of FIG. 4 is for illustrative purposes only. Other MEMS or non-MEMS microphones thus may be used with illustrative embodiments of the invention.

As noted above, the two microphones illustratively are configured to have different sensitivities (i.e., to be responsive to signals having different frequency ranges). Among other ways, those two frequency ranges may overlap at higher frequencies. For example, the primary microphone 18A may be responsive to signals from a very low-frequency (e.g., 100 hertz) up to some higher frequency. The secondary microphone 18B, however, may be responsive to signals from a higher low frequency (e.g., 500 Hertz) up to the same (or different) higher frequency as the primary microphone 18A. Of course, it should be noted that these discussed frequency ranges are illustrative and not intended to limit various aspects of the invention.

Figure 5A:
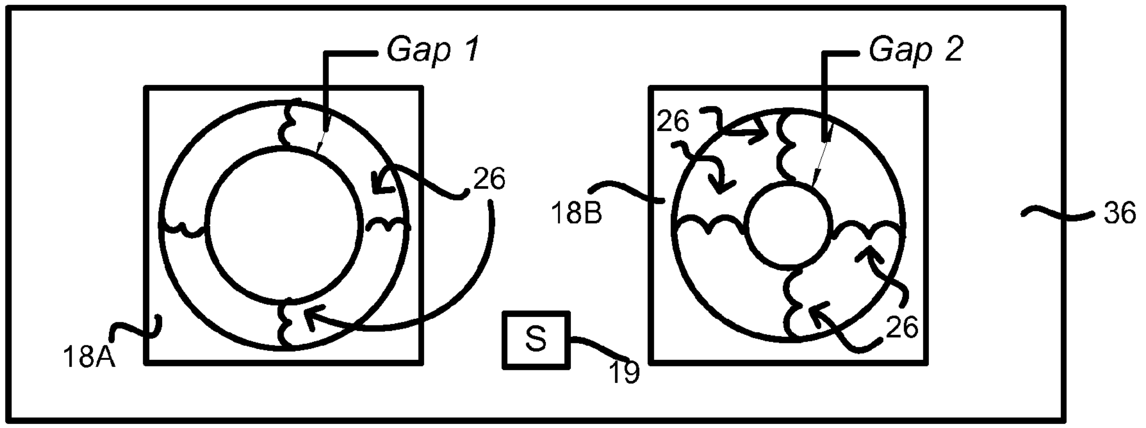
FIG. 5A schematically shows a plan view of the microphone system in accordance with a first embodiment of the invention.

To those ends, FIG. 5A schematically shows a plan view of the microphone system 12 in accordance with a first embodiment of the invention. Specifically, the microphone system 12 includes the primary and secondary microphones 18A and 18B fixedly secured to an underlying printed circuit board 36, and selector 19 discussed above. Because it is a plan view, FIG. 5A shows the respective diaphragms 24 of the microphones 18 and 18B and their springs 26. This configuration of having a diaphragm 24 supported by discrete springs 26 produces a gap between the outer parameter of the diaphragm 24 and the inner parameter of the structure to which each spring 26 connects. This gap is identified in FIG. 5A as "gap 1" for the primary microphone 18A, and "gap 2" for the secondary microphone 18B.

Figure 6A:
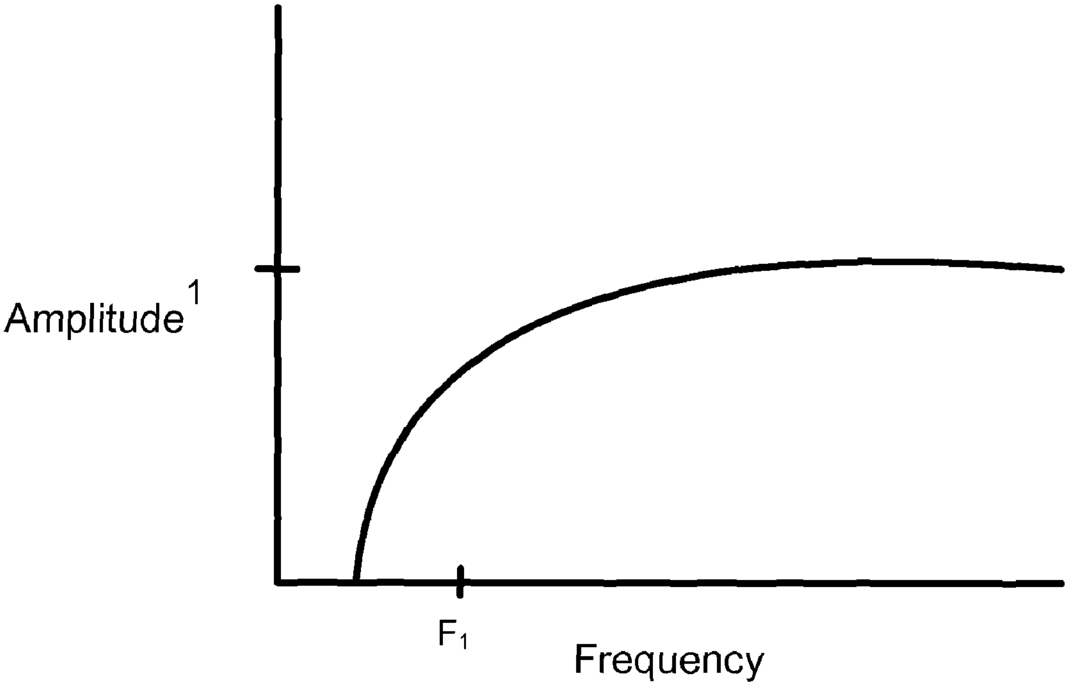
FIG. 6A schematically shows the frequency response for the primary microphone in the microphone system of illustrative embodiments of the invention.

As known by those skilled in the art it is generally desirable to minimize the size of that gap (e.g., gap 1) to ensure that the microphone can respond to low-frequency audio signals. In other words, if the gap is too large, the microphone may not be capable of detecting audio signals having relatively low frequencies. Specifically, with respect to the frequency response of a microphone, the location of its low frequency cut-off (e.g., the 30 dB point) is a function of this gap. FIG. 6A schematically shows an illustrative frequency response curve of the primary microphone 18A when configured in accordance with illustrative embodiments of the invention. As shown, the low frequency cut-off is F1, which preferably is a relatively low frequency (e.g., 100-200 Hz, produced by an appropriately sized gap, such as a gap of about 1 micron).

Figure 6B:
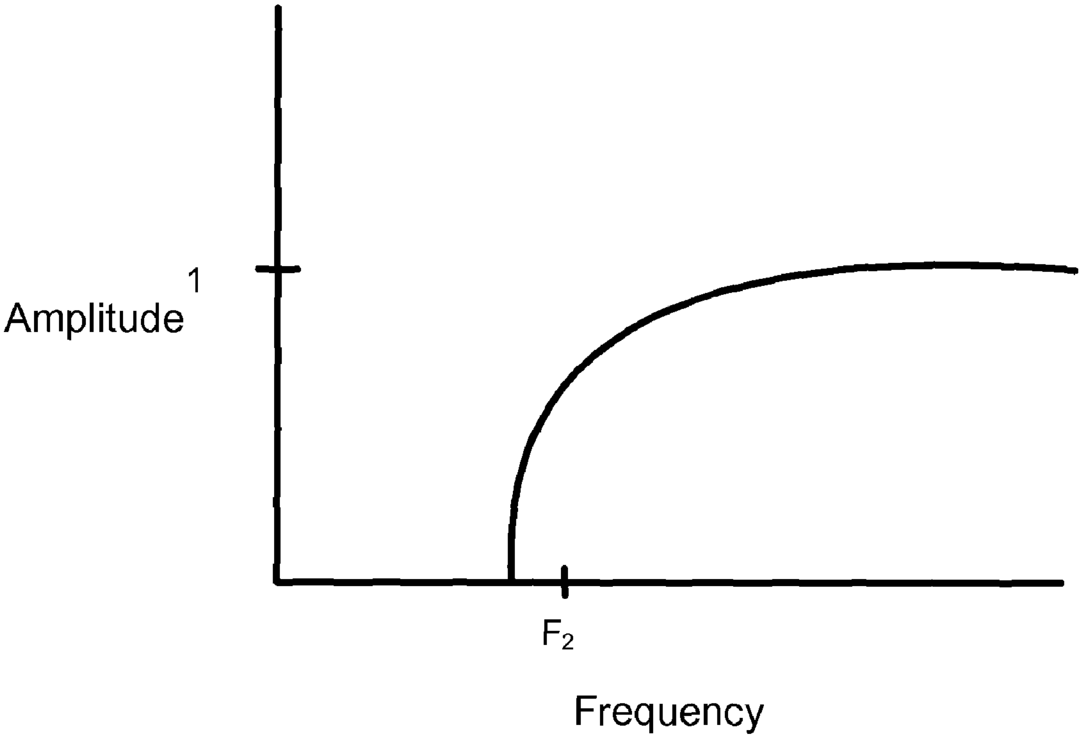
FIG. 6B schematically shows the frequency response for the secondary microphone in the microphone system of illustrative embodiments of the invention.

In accordance with one embodiment of the invention, gap 2 (of the secondary microphone 18B) is larger than gap 1 (of the primary microphone 18A). Accordingly, as shown in FIG. 6B (showing the frequency response of the secondary microphone 18B), the low frequency cut-off F2 (e.g., 2-2.5 KHz, produced by an appropriately sized gap, such as about 5-10 microns) of the secondary microphone 18B is much higher than the cut-off frequency F1 of the primary microphone 18A. As a result, the secondary microphone 18B does not adequately detect a wider range of low-frequency audio signals (e.g., low frequency noise, such as wind noise that saturates the electronics). In other words, increasing the size of gap 2 effectively acts as an audio high pass filter for the secondary microphone 18B.

There are various ways to make gap 2 larger than gap 1 while still ensuring that both microphones 18A and 18B have substantially identical responses to noise signals. Among other ways, the diaphragms 24 may be formed to have substantially identical masses. To that end, the diaphragm 24 of the secondary microphone 18B may be thicker than the diaphragm 24 of the primary microphone 18A, while the diameter of the diaphragm 24 of the secondary microphone 18B is smaller than the diameter of the diaphragm 24 of the primary microphone 18A.

Figure 5B:
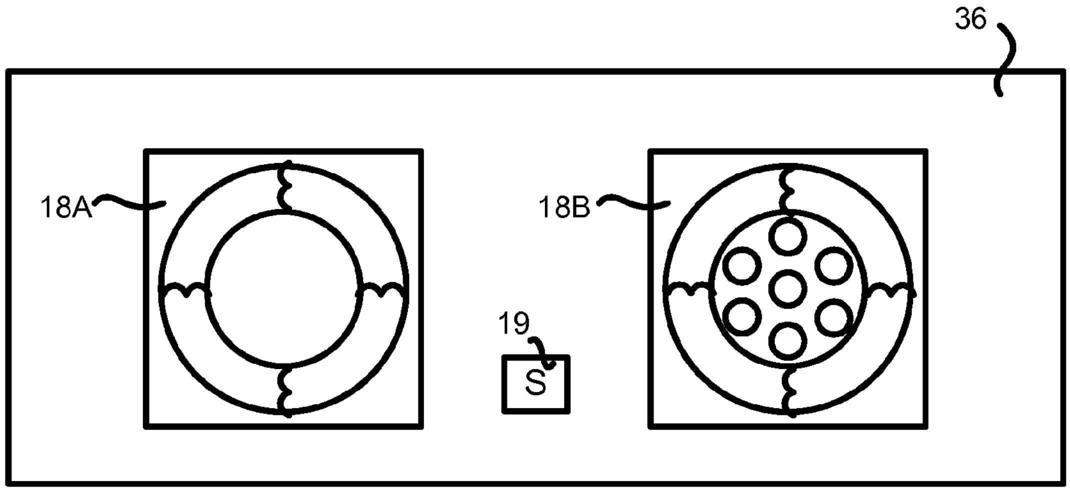
FIG. 5B schematically shows a plan view of the microphone system in accordance with a second embodiment of the invention.

FIG. 5B schematically shows another embodiment in which the gaps discussed above are substantially identical. Despite having identical gaps, the secondary microphone 18B still is configured to have a frequency response as shown in FIG. 6B (i.e., having a higher cut-off frequency). To that end, the diaphragm 24 of the secondary microphone 18B has one or more perforations or through-holes that effectively increase the cut-off frequency. Specifically, the cut-off frequency is determined by the amount of area defined by the gap and the hole(s) through the diaphragm 24. This area thus is selected to provide the desired low frequency cut-off.

In general terms, the embodiments shown in FIGS. 5A and 5B are two of a wide variety of means for controlling the air leakage past the respective diaphragms 24. In other words, those embodiments control the rate at which air flows past the diaphragm 24, thus controlling the respective low frequency cut-off points. Those skilled in the art therefore can use other techniques for adjusting the desired low frequency cut-off of either microphone 18A and 18B.

The entire microphone system 12 may be formed in a number of different manners. For example, the system 12 could be formed within a single package as separate dies (e.g., the microphone 18A, microphone 18B, and selector 19 as separate dies), or on the same dies. As another example, the system 12 could be formed from separately packaged elements that cooperate to produce the desired output.

During operation, both microphones should receive substantially the same audio signal (e.g., a person's voice) and associated noise. For example, noise can include, among other things, wind blowing into the microphones, the impact of the telephone being dropped on the ground, rubbing of a phone against a user's face, or noise in a camera from a motor moving a lens. The secondary microphone 18B should not detect this noise if the frequency of the noise signal is below its low frequency cut-off F2. To the contrary, however, the primary microphone 18A detects this noise. The selector 19 therefore determines if this noise is of such a magnitude that the output signal from the secondary microphone 18B should be used. For example, if the noise saturates the primary microphone circuitry, then the selector 19 may forward the output signal from the secondary microphone 18B to the output.

Those skilled in the art understand that when there is no noise, the quality of the signal produced by the secondary microphone 18B may not be as good as that of the primary microphone 18A. Noise nevertheless may change that, thus causing the quality of the signal from the secondary microphone 18B to be better than that of the signal from the primary microphone 18A. Accordingly, despite its nominally less optimal performance, the output signal of the secondary microphone 18B may be more desirable than that of the primary microphone 18A.

In alternative embodiments, rather than using the logical high pass filter (e.g., the larger gap), the secondary microphone 18B has an actual high pass filter. To that end, both microphones 18A and 18B may be substantially structurally the same and thus, have substantially the same responses to audio signals. The output of the secondary microphone 18B, however, may be directed to a high pass filter, which filters out the low frequency signals (e.g., the noise). Accordingly, if the selector 19 detects low frequency noise, such as wind, it may direct the output of the high pass filter to the output of the microphone system 12. This should effectively produce a similar result to that of other embodiments discussed above.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., the selector 19 may be formed from application specific integrated circuits, FPGAs, and/or digital signal processors), or other related components.

In an alternative embodiment, the disclosed apparatus and methods (e.g., see the flow chart described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A microphone system comprising:

a primary microphone for producing a primary signal and having a primary diaphragm and a first air leakage rate past the primary diaphragm;

a secondary microphone for producing a secondary signal and having a secondary diaphragm and a second air leakage rate past the secondary diaphragm, the first air leakage rate and second air leakage rate being different;

a selector operatively coupled with the primary microphone and the secondary microphone;

a base mechanically coupling the primary and secondary microphones such that the primary and the secondary microphones receive the same mechanical signals; and an output, the selector selectively permitting one or both of at least a portion of the primary signal and at least a portion of the secondary signal to be forwarded to the output as a function of the noise in the primary signal.

2. The microphone system as defined by claim 1 wherein the respective portions of the primary signal or secondary signal may be processed prior to being forwarded to the output.

3. The microphone system as defined by claim 1 wherein the primary microphone has a primary low frequency cut-off, the secondary microphone having a secondary low frequency cut-off, the secondary low frequency cut-off being greater than the primary low frequency cut-off.

4. The microphone system as defined by claim 3 wherein the primary microphone has a primary circumferential gap defined at least in part by the primary diaphragm, the secondary microphone having a secondary circumferential gap defined at least in part by the secondary diaphragm, the secondary circumferential gap being greater than the primary circumferential gap.

5. The microphone system as defined by claim 1 wherein the selector forwards at least a portion of the primary signal to the output if the noise is below about a predefined amount.

6. The microphone system as defined by claim 5 wherein the selector forwards at least a portion of the secondary signal to the output if the noise is greater than about the predefined amount.

7. The microphone system as defined by claim 1 wherein the portion of the primary signal is not forwarded to the output when the portion of the secondary signal is forwarded to the output.

8. The microphone system as defined by claim 1 wherein the portion of the secondary signal is not forwarded to the output when the portion of the primary signal is forwarded to the output.

9. A microphone system comprising:

a primary microphone for producing a primary signal;

a secondary microphone having a high pass filter for producing a secondary signal;

a base mechanically coupling the primary and secondary microphones such that the primary and the secondary microphones receive the same mechanical signals;

a selector operatively coupled with the primary microphone and the secondary microphone; and an output, the selector having a detector for detecting low frequency noise, the selector permitting at least a portion of the primary signal to be forwarded to the output if the detector detects no low frequency noise, the selector permitting at least a portion of the secondary signal to be forwarded to the output if the detector detects low frequency noise, wherein the primary microphone has a primary low frequency cut-off, the secondary microphone having a secondary low frequency cut-off, the secondary low frequency cut-off being greater than the primary low frequency cut-off, wherein the primary microphone has a primary diaphragm and a primary circumferential gap defined at least in part by the primary diaphragm, the secondary microphone having a secondary diaphragm and a secondary circumferential gap defined at least in part by the secondary diaphragm, the secondary circumferential gap being greater than the primary circumferential gap.

10. The microphone system as defined by claim 9 wherein the detector does not detect low frequency noise if low frequency noise is below a predefined amount.

11. The microphone system as defined by claim 9 wherein the primary and secondary microphones are MEMS devices.

12. The microphone system as defined by claim 9 further wherein the base comprises a two way communication device.

13. The microphone system as defined by claim 9, wherein the base is a die attach pad of a semiconductor package.

14. The microphone system as defined by claim 9, wherein the base is a semiconductor die.

15. The microphone system as defined by claim 9, wherein the base is a telephone body.

16. The microphone system as defined by claim 9, wherein the base is at least one of a dashboard of a car, a video recorder, a camcorder and a tape recorder.

* * * * *